United States Patent
Hiraga et al.

(10) Patent No.: US 6,443,461 B1
(45) Date of Patent: Sep. 3, 2002

(54) SEALING APPARATUS AND UNIVERSAL JOINT USING THE SAME

(75) Inventors: Yoshio Hiraga; Shinya Toita; Teiji Suka, all of Tochigi (JP)

(73) Assignee: Snowa Corporation (JP)

( * ) Notice: Subject to any disclaimer, the term of this patent is extended or adjusted under 35 U.S.C. 154(b) by 0 days.

(21) Appl. No.: 09/559,038

(22) Filed: Apr. 27, 2000

(30) Foreign Application Priority Data

Apr. 27, 1999 (JP) ............................................ 11-120484

(51) Int. Cl.[7] ................................ F16J 3/00; F16J 15/52
(52) U.S. Cl. ...................... 277/634; 277/635; 277/637; 464/173
(58) Field of Search ................................. 277/634, 635, 277/637, 641, 644, 648; 464/173, 175

(56) References Cited

U.S. PATENT DOCUMENTS 3,468,171 A * 9/1969 Macielinski ................. 277/634
4,685,686 A * 8/1987 Weiler ......................... 277/634
5,295,914 A * 3/1994 Milavec ....................... 277/637
6,093,108 A * 7/2000 Moulinet ..................... 277/634

FOREIGN PATENT DOCUMENTS

JP         724683      5/1995      ............. B62D/5/00

* cited by examiner

*Primary Examiner*—Anthony Knight
*Assistant Examiner*—Enoch E Peavey
(74) *Attorney, Agent, or Firm*—Orum & Roth

(57) ABSTRACT

A sealing apparatus 20 is provided with an annular elastic member 21 and a reinforcing member 23 to which the elastic member 21 is securely fixed, and is attached to an annular stepped portion 12b of a cylindrical member 12. The elastic member 21 has a sealing portion coming into contact with the inner surface of the stepped portion 12b of the cylindrical member 12 and the inner periphery surface of a large cylinder portion 12c in an airtight manner. Further, the sealing apparatus 20 has a holding portion including a cylinder portion 24 press-inserted into the inner periphery of the small cylinder portion 12a of the cylindrical member 12; and an elastic outer cylinder portion 25.

12 Claims, 9 Drawing Sheets

US 6,443,461 B1

SEALING APPARATUS AND UNIVERSAL JOINT USING THE SAME

BACKGROUND OF THE INVENTION

1. Field of the Invention

The present invention relates to a sealing apparatus attached to an inner periphery of a boot, which is provided between an inner and an outer element of a universal joint of a propeller shaft and a drive shaft of a vehicle, for example, in order to seal and hold a lubricating agent such as grease therein, and to prevent dust, water or the like from invading from the outside.

2. Description of the Related Art

Conventionally, a universal joint for use in a drive shaft of a vehicle, as illustrated in FIG. 10, for example, includes a tripod type constant speed joint comprising a cylindrical outer and an inner element fitted into the outer element. In this universal joint 'a', an inner element 'b' is provided with a drive shaft 'd', a ring shaped member mounted to an end of the drive shaft 'd', and three rollers turnably supported, respectively, by three bearings extending in a peripheral direction from the ring shaped member with equal intervals and outwardly in a radial direction. In addition, a three-stripe guide groove formed along an axial direction for housing the three rollers of the inner element 'b', respectively, is formed on an inner periphery of an outer element 'c'. Further, a torque is transmitted between the inner element 'b' and the outer element 'c' via the three rollers engaged with the guide groove.

On the other hand, a boot 'e' mounted across the outer element 'c' and the inner element 'b' of this universal joint 'a' comprises a cylindrical adapter 'f' and an expandable flexible boot main body 'g' securely fixed to one end of the adapter ° F. The adapter 'f' is engaged with an outer periphery of the outer element 'c', and the boot main body 'g' is engaged with an outer periphery of the drive shaft 'd'. Further, an O-ring 'h' is attached to an annular stepped portion formed on the inner periphery of the adapter 'f'. In this manner, the boot 'e' causes its inside to be held in an airtight manner, a lubricating agent filled therein is prevented from leaking, and dust, water or the like is prevented from invading into the inside.

In the meantime, in the prior art, the O-ring 'h' attached to the stepped portion of the inner periphery of the adapter 'f' is easily deformed because the shape holding force of the O-ring itself is small, which is caused by flexibility of its forming material. As illustrated if FIG. 11, even if a portion is at a normal position of the stepped portion, the other portion is sometimes attached in a state in which it is displaced from the normal portion. If the inner element 'b' and the outer element 'c' are assembled with each other in such state, the O-ring 'h' is geared between surfaces other than a sealing surface of the outer element 'c', and sufficient sealing capability cannot be performed.

In addition, in such state, the O-ring 'h' easily slips off from the stepped portion Further, in order to prevent the O-ring from deforming when the O-ring 'h' is attached to the stepped portion of the adapter 'f', it is difficult to hold the O-ring 'h' with large elastic force in a radial direction on the inner periphery of the adapter 'f'. Thus, the holding force of the O-ring 'h' to the adapter 'f' is small. As a result, even if the O-ring 'h' is attached to a normal position, in the case where a shock is applied to the boot 'e', the O-ring 'h' sometimes slips off from the stepped portion. Thus, the inner element 'b' and the outer element 'c' are assembled with each other while the O-ring 'h' slips off, and the sealing capability will be degraded.

Therefore, assembling work must be performed while it is checked whether or not the O-ring 'h' is properly attached to the adapter 'f', which has lowered the efficiency of the assembly of the universal joint 'a'.

SUMMARY OF THE INVENTION

The present invention has been achieved in view of such circumference. It is an object of the present invention to provide a sealing apparatus securely held on an inner periphery of a cylindrical member in a normal state, thereby improving the efficiency of assembly of a member to which the sealing apparatus is attached.

In accordance with the present application, there is provided a sealing apparatus comprising: an elastic member having a sealing portion coming into contact with a sealing surface of a cylindrical member in an airtight manner, and a reinforcing member having the elastic member securely fixed thereto, the sealing apparatus being attached to an inner periphery of the cylindrical member having a stepped portion formed between a small cylinder portion having a predetermined inner diameter and a large cylinder portion having an inner diameter larger than the small cylinder portion, wherein the sealing surface is formed on at least one of an inner surface of the stepped portion and an inner periphery surface of the large cylinder portion, and further, a holding portion press-inserted into the inner periphery of the small cylinder portion is provided so as to hold the reinforcing member on the inner periphery of the cylindrical member.

In this specification, circles such as cylinder, ring, circumference, arc or the like include a substantially circular shape that is a shape close to a circle as well as an exact circular shape. In addition, in the specification, an outer engagement completion close position means a position at which, even if a communication passage is closed at the position, and then, the outer element is relatively moved to an engagement completion position relevant to a boot, the boot does not inflate along with a rise of the air pressure inside of the boot caused by the relative movement, or even if such inflation occurs, the inflation is so slight that it can be substantially ignored.

BRIEF DESCRIPTION OF THE DRAWINGS

The present invention will be more fully understood from the detailed description given below and from the accompanying drawings which should not be taken to be a limitation on the invention, but are for explanation and understanding only. The drawings

DESCRIPTION OF THE PREFERRED EMBODIMENTS

A description will be given below of embodiments in accordance with the present invention with reference to FIGS. 1 to 9.

Figure 1:
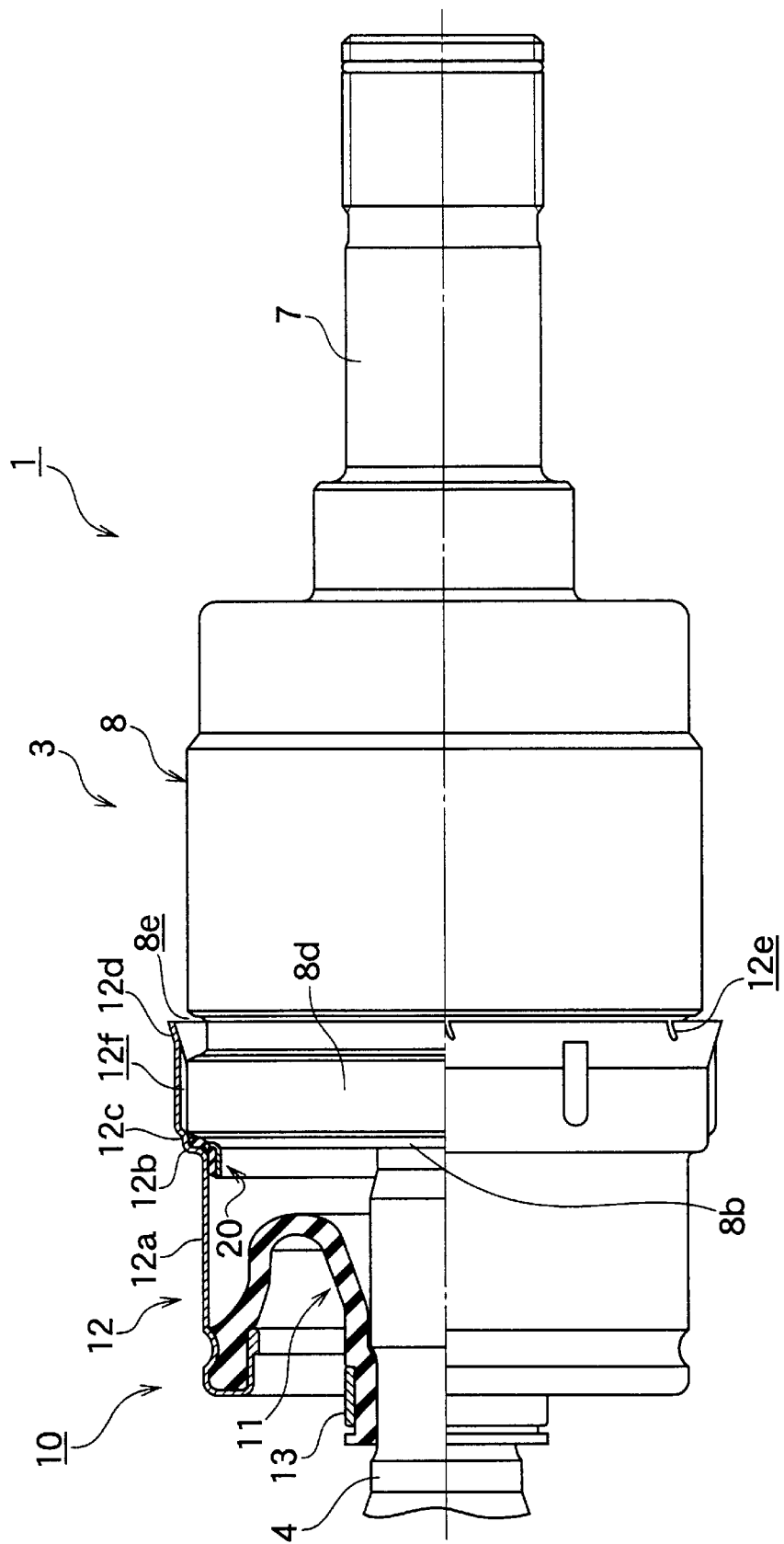
FIG. 1 is a side elevational view showing a universal joint in accordance with one embodiment of the present invention and a part of the universal joint in a fitting operation completing state in a cross sectional manner.
Figure 2:
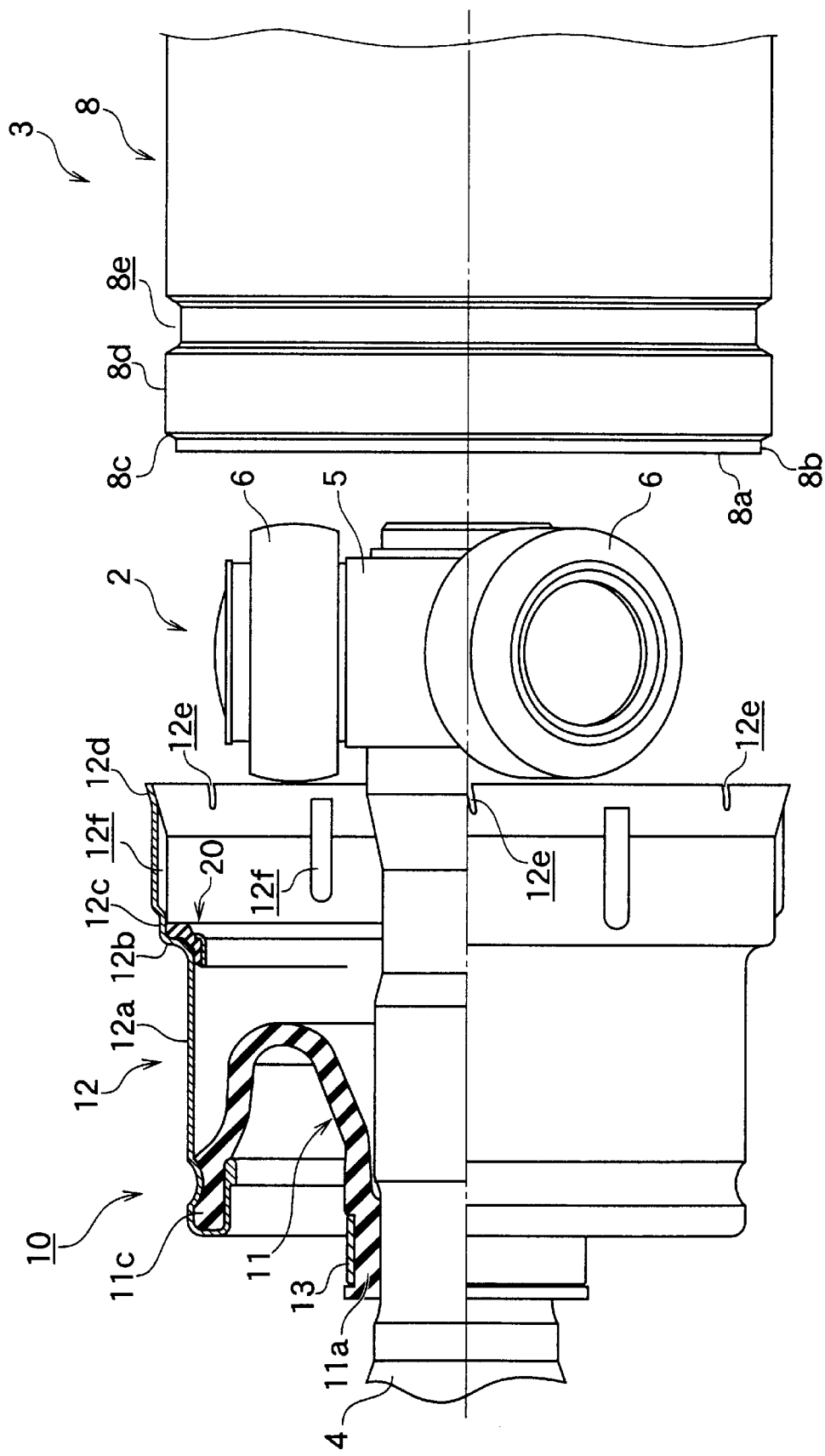
FIG. 2 is a side elevational view showing a part of the universal joint in a state prior to an assembly in a cross sectional manner.
Figure 3:
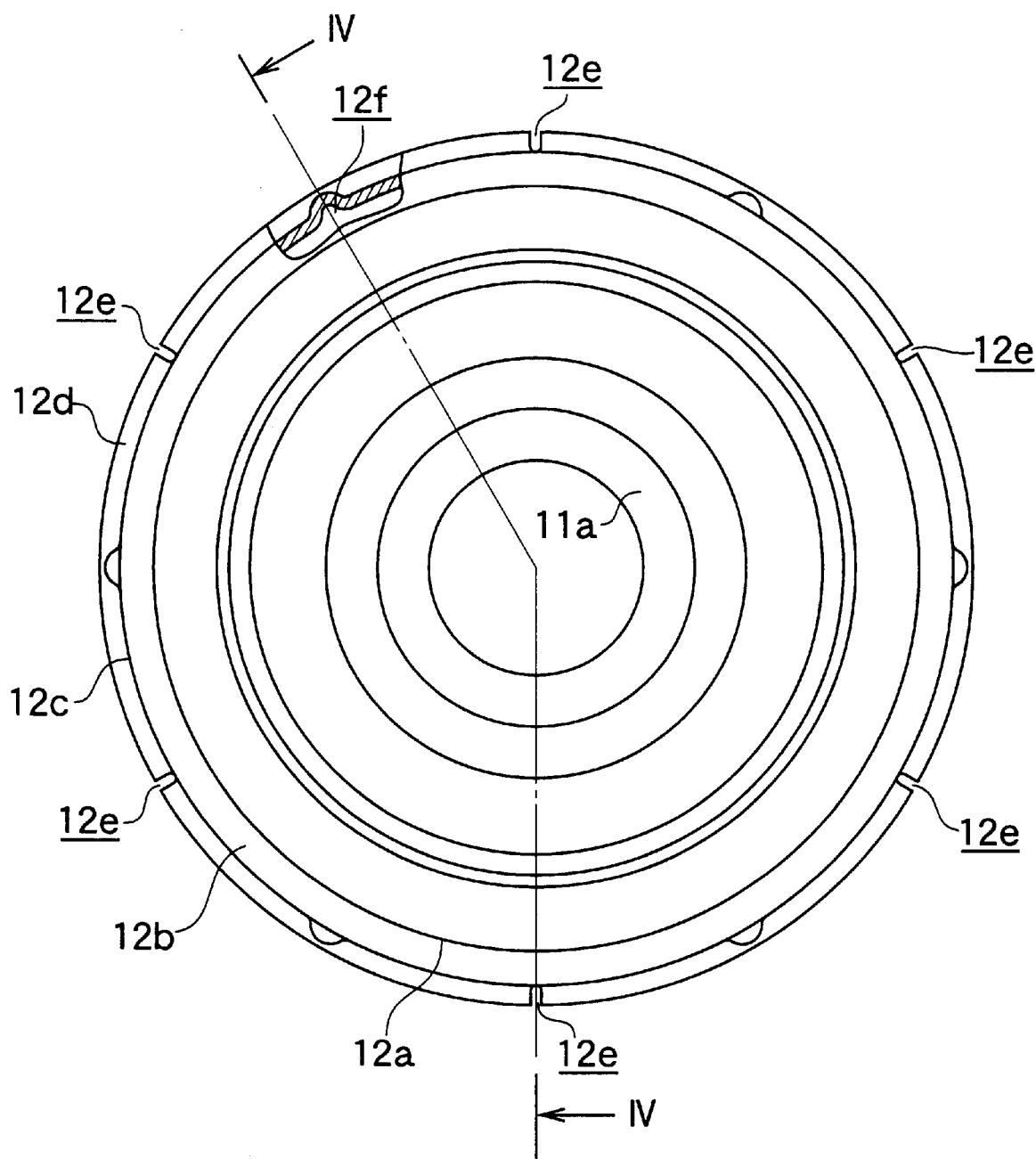
FIG. 3. Is a front elevational view of a boot.
Figure 4:
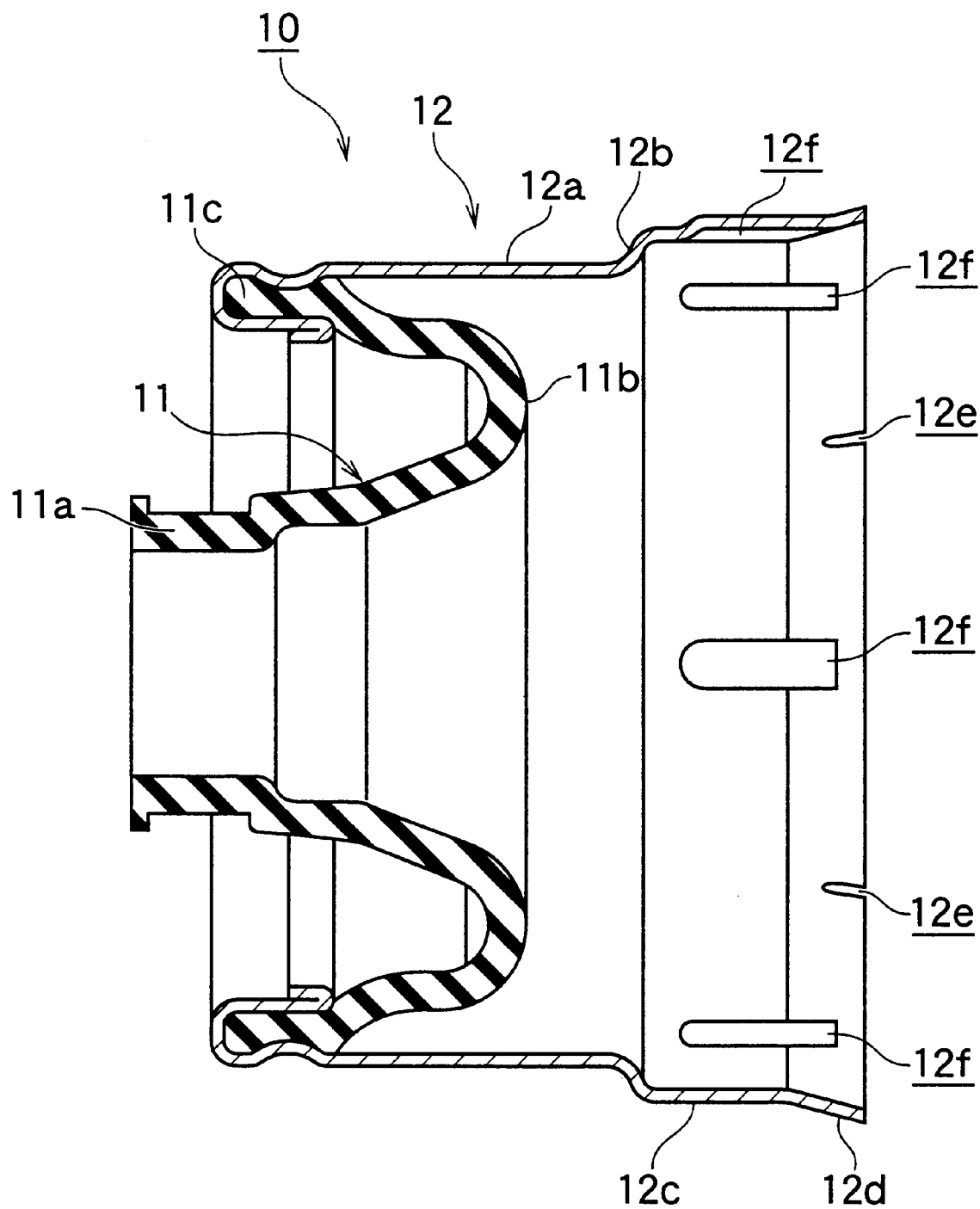
FIG. 4. Is a cross sectional view taken along a line IV—IV in FIG. 3.
Figure 5:
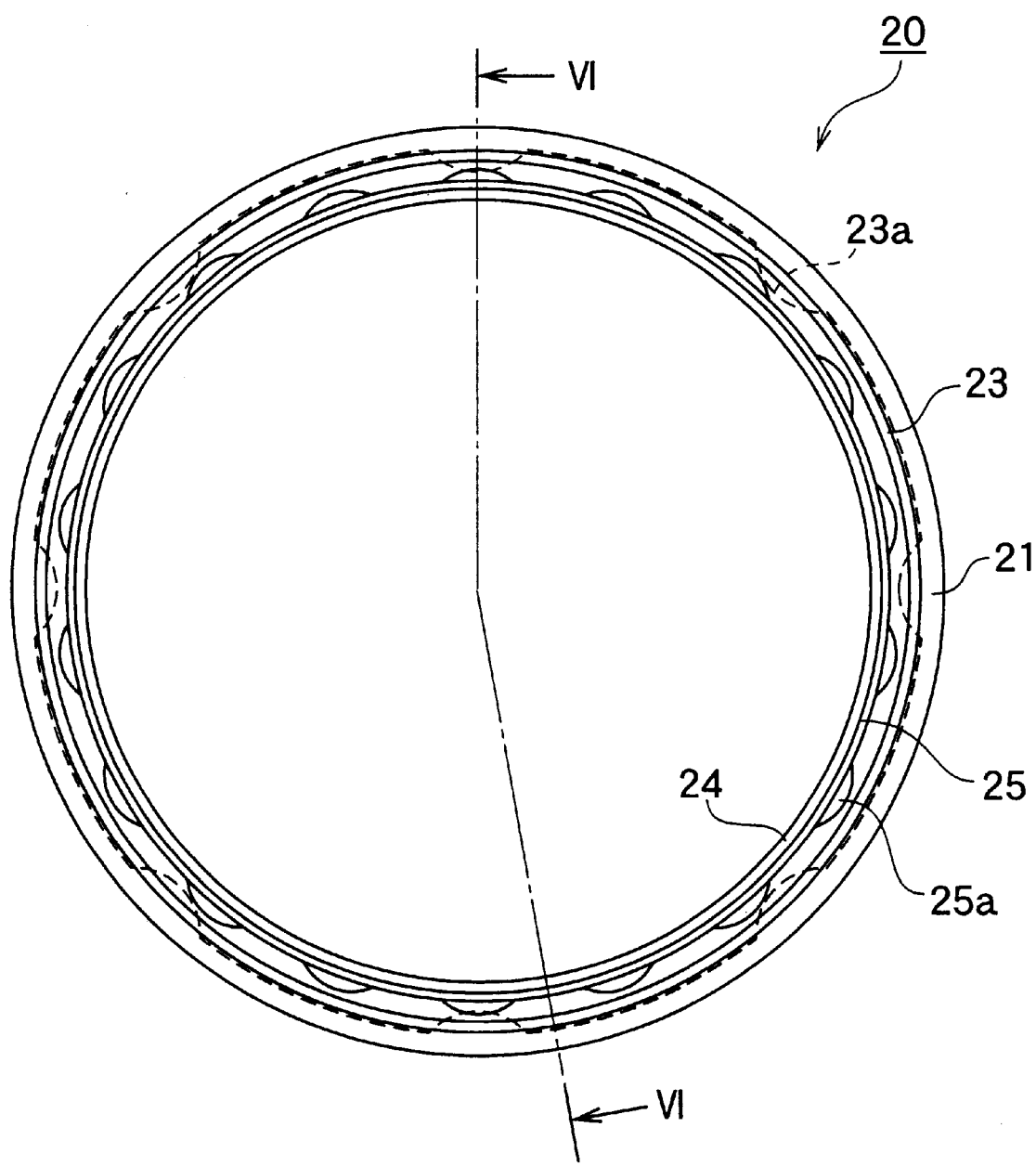
FIG. 5. Is a front view showing the sealing apparatus.
Figure 6:
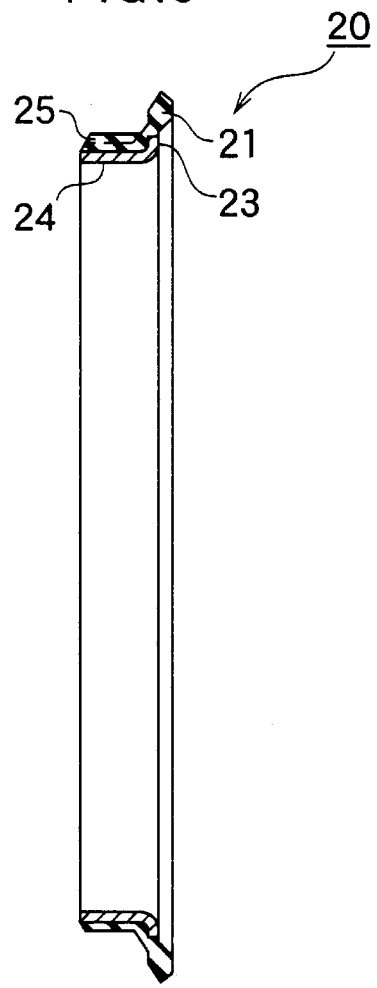
FIG. 6. Is a sectional view taken along line VI—VI of FIG. 5.
Figure 7:
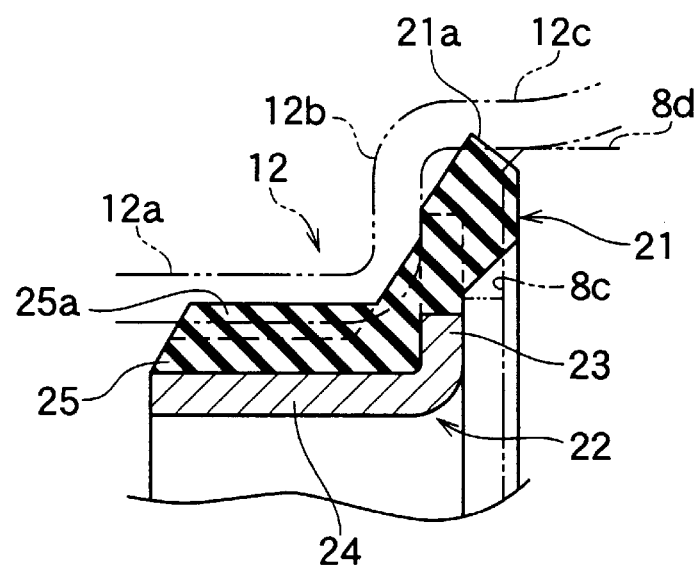
FIG. 7 is an enlarged view showing essential parts of the sealing apparatus.
Figure 8:
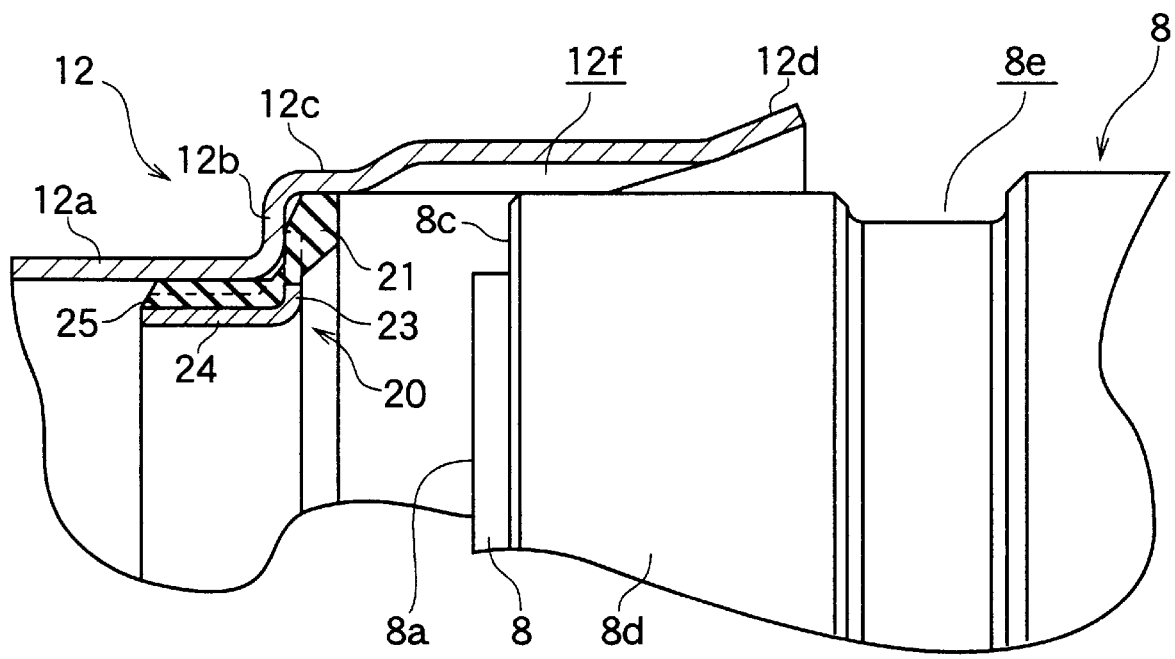
FIG. 8 is an enlarged view showing essential parts of the universal joint of FIG. 1 while the universal joint is engaged.
Figure 9:
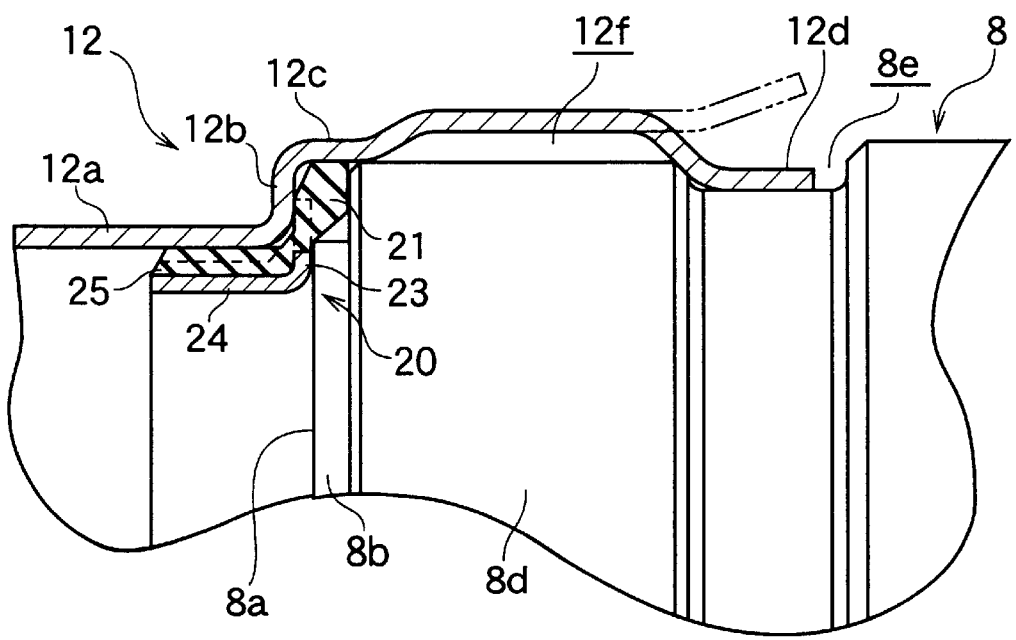
FIG. 9 is an enlarged view showing essential parts of the universal joint of FIG. 1 when its assembling has been completed.
Figure 10:
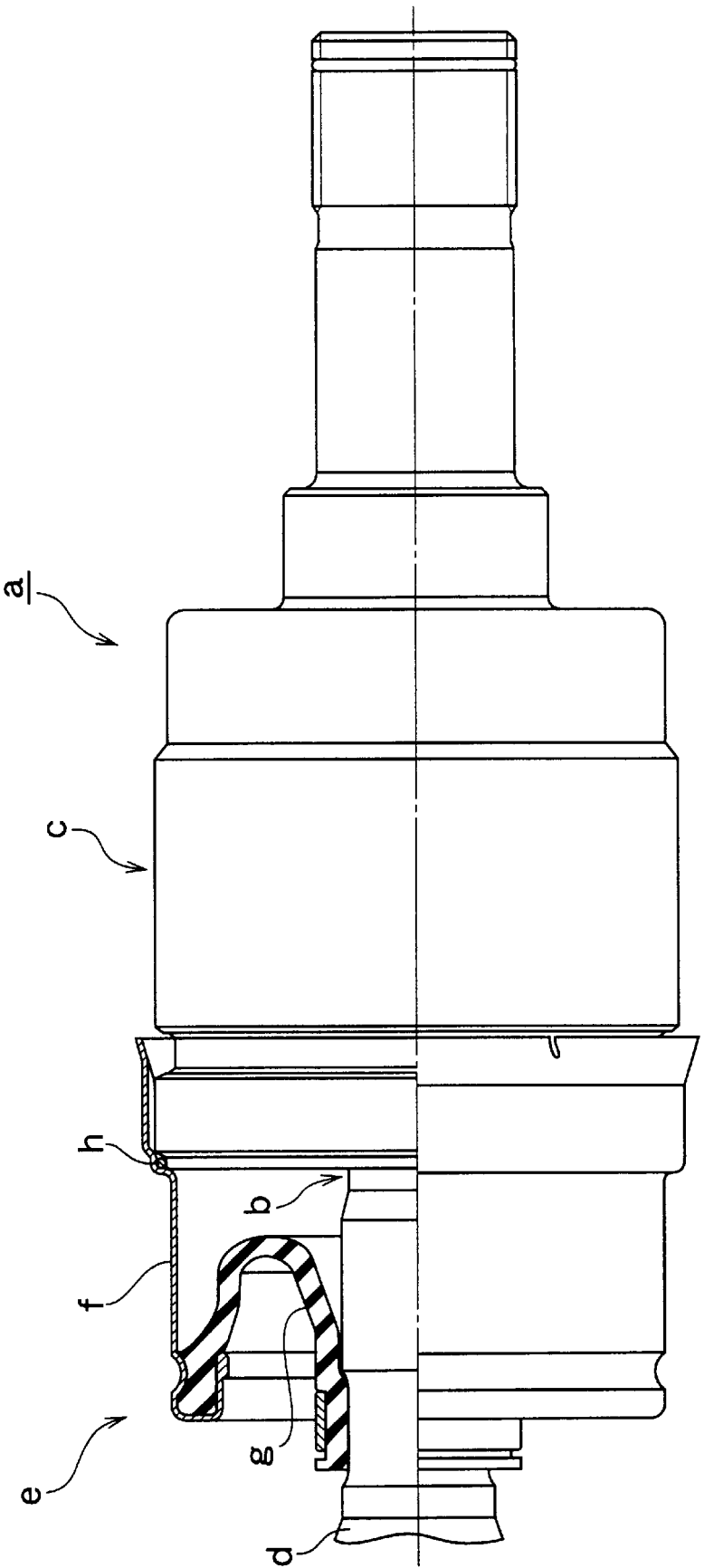
FIG. 10 is a view showing prior art.
Figure 11:
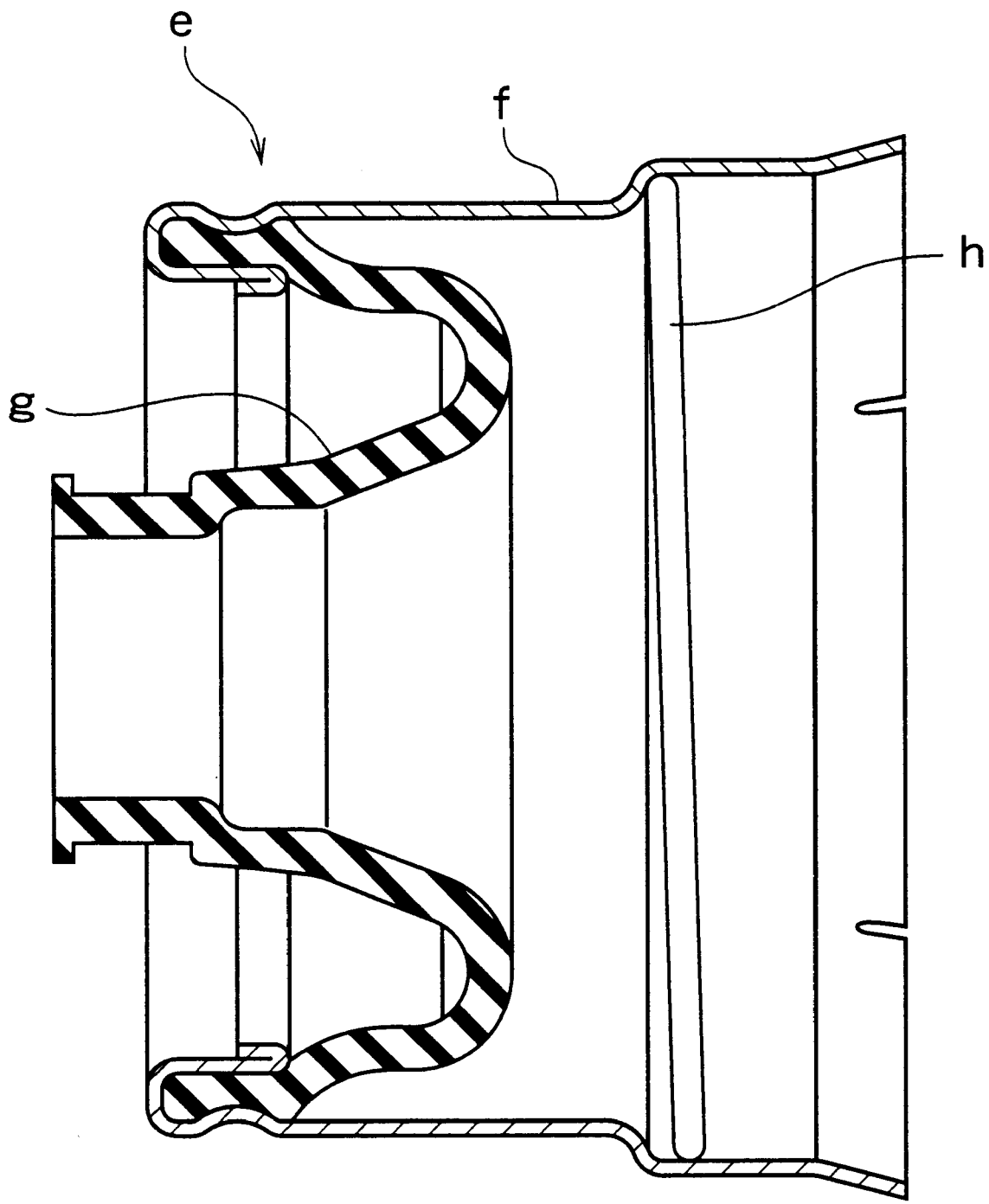
FIG. 11 is an illustrative view when the O-ring is mounted at a position free from a normal mount position.

FIG. 1 is a side elevational view showing a universal joint in accordance with one embodiment of the present invention and a part of the universal joint in a fitting operation completed state in a cross sectional manner, FIG. 2 is a side elevational view showing a part of the universal joint in a state prior to an assembly in a cross sectional manner, FIG. 3 is a front elevational view of a boot, FIG. 4 is a cross sectional view taken along a line IV—IV in FIG. 3, FIG. 5 is a front view showing the sealing apparatus; FIG. 6 is a sectional view taken along line VI—VI of FIG. 5; FIG. 7 is an enlarged view showing essential parts of the sealing apparatus; FIG. 8 is an enlarged view showing essential parts of the universal joint of FIG. 1 while the universal joint is engaged; and FIG. 9 is an enlarged view showing essential parts of the universal joint of FIG. 1 when its assembling has been completed.

The universal joint 1 is a tripod type uniform joint which is used in a propeller shaft of a vehicle. As shown in FIGS. 1 and 2, an inner element 2 has a shaft portion 4 corresponding to a drive shaft, a ring-like spider S which is spline fitted to a shaft end portion of the shaft portion 4 and integrally rotates with the shaft portion 4, and three rollers 6 which are rotatably support to three support shafts arranged in a peripheral direction of the spider 5 at a uniform interval and extending outward in the diametrical direction, respectively via a holder.

An outer element 3 corresponding to a joint has a shaft portion 7 and a cylindrical portion 8. The roller 6 supported to the spider 5 of the inner element 2 is received in an inside of the cylindrical portion 8. Accordingly, three guide grooves disposed along an axial direction are formed in the inner periphery of the cylindrical portion 8 at a uniform interval in a peripheral direction, and three rollers 6 are respectively engaged in a direction of rotation within the guide grooves and freely move in an axial direction. Further, a torque is transmitted between the outer element 3 and the inner element 2 via the roller 6 engaged with the guide groove.

An opening end surface 8a, a small diameter circumferential surface 8b, a step end surface 8c formed between the small diameter circumferential surface 8b and a fitting circumferential surface 8d mentioned below, the fitting circumferential surface 8d and an annular groove 8e are formed on an outer periphery of the outer element 3, in this order. The small diameter circumferential surface 8b is an outer diameter greater than the fitting circumferential surface 8d, and an elastic member 21 of the sealing apparatus 20 described later, which is attached to the inner periphery of the adapter 12 of the boot 10 described later being positioned outwardly in the radial direction of the small diameter circumferential surface 8b. Further, the fitting circumferential surface 8d is fitted to an inner periphery of a large cylinder portion 12c of an adapter 12 in a press insertion state being centered between the outer element 3 and the adapter 12, and is structured such that no play is generated between the both.

As illustrated in FIGS. 3 and 4, a boot 10 is provided for sealing between the inner element 2 and the outer element 3, preventing lubricant such as grease charged within the outer element 3 and with the boot 10 from leaking and preventing dust, water and the like from entering into the boot 10. The boot 10 is constituted by a boot main body 11 and an adapter 12.

The flexible boot main body 11 formed by elastic material such as a rubber or the like has a small cylinder end portion 11a, a large cylinder end portion 11c positioned outward in a diametrical direction of the small cylinder end portion 11a, and a curve portion 11b formed by being folded between both of the cylinder end portions 11a and 11c. The small cylinder end portion 11a is structured such that the shaft portion 4 of the inner element 2 is fitted to the inside thereof and the small cylinder end portion is fastened and fixed by a band 13, whereby the boot main body 11 and the shaft portion 4 are sealed. Further, the large cylinder end portion 11c of the boot main body 11 is gripped by a folded end portion of a small cylinder portion 12a mentioned below of the adapter 12 from an outer peripheral side and an inner peripheral side thereof, and is fixed to the adapter 12.

The cylindrical adapter 12 with a step formed by a metal material such as a stainless steel plate or the like has the small cylinder portion 12a having a predetermined inner diameter, a large cylinder portion 12c having an inner diameter, a large cylinder portion 12c having an inner diameter larger than the inner diameter of the small cylinder portion 12a, an annular step portion 12b formed between both of the cylinder portions 12a and 12c, and a taper portion 12d extending from the large cylinder portion 12c to the opening end surface.

Since the inner diameter of the large cylinder portion 12c of the adapter 12 is set so as to have a suitable press inserting space with respect to the fitting circumferential surface 8d of the fitted outer element 3, it is set so as to be smaller than the outer diameter of the fitting circumferential surface 8d at a degree corresponding to the press inserting space, The taper portion 12d of the adapter 12 is formed in a shape such that an inner diameter thereof gradually increases from the large cylinder portion 12c toward the opening end surface. Six slits 12e are formed in the taper portion 12d from the opening end surface at a substantially middle position between two communication grooves 12f mentioned below in a peripheral direction at a uniform interval, whereby it is easy to reduce the diameter of the taper portion 12d by caulking of the taper portion 12d with respect to the groove 8e. six communication grooves 12f are formed in the adapter 12 from the large cylinder portion 12c to the taper portion 12d in a peripheral direction at a uniform interval, The communication groove 12f is formed by swelling the adapter 12 to the outside in a diametrical direction so as to form a circular arc. The communication groove 12f extends from the taper portion 12d to a predetermined position in an axial direction of the large cylinder portion 12c along an axial direction, and a communication passage for communicating the inside of the boot 10 with the open air is formed between the communication groove 12f and the fitting circumferential surface 8d of the outer element 3. The predetermined position mentioned above corresponds to a position at which a communication between the inside of the boot 10 and the communication groove 12f is shut when the outer element 3 is positioned at a position near the fitting operation completing position and the outer element 3 is brought into contact with the elastic member 21 of a sealing apparatus 20. In this embodiment, it is positioned near the portion close to the opening end surface of the contact portion with the elastic member 21 on the inner periphery of the large cylinder portion 12c.

The sealing apparatus 20 is attached to the inner surface of the step portion 12b of the adapter 12. A gap between the inner surface of the adapter 12 and the outer surface of the outer element 3 is sealed while the outer element 3 reaches its engagement completion position.

A description will be given of the sealing apparatus 20 with reference to FIGS. 5 to 7. The sealing apparatus 20 is structured such that a rubber member made of, for example, an acrylonitrile-butadiene rubber (NBR) corresponding to elastic material is fixed to a metal fitting 22, for example, integrally formed from a steel plate by baking or the like. Further, the metal fitting 22 having an L-shaped cross section is constituted by a cylinder portion 24 and an annular outer flange 23 perpendicularly crossing an axis of the cylinder portion 24.

The rubber member is integrally baked all over a portion close to an inside in a diametrical direction of a side surface of the flange 23 in a side of the cylinder portion 24 (hereinafter, referred to as a cylinder portion side flange side surface), all the surface of a peripheral edge surface of the flange 23, a portion close to an outside in a diametrical direction of a side surface of the flange 23 opposite to the side surface on which the cylinder portion 24 is provided (hereinafter, referred to as an opposite cylinder portion side flange side surface) and all the surface of the outer periphery of the cylinder portion 24. The rubber member baked on the cylinder portion side flange side surface is formed as a taper surface in which a thickness of the rubber member is reduced toward the outside in the diametrical direction.

A plurality of notch portions 23a each having an outer shape formed in a circular arc shape are formed in the flange 23 in a peripheral direction at a uniform interval. Since the rubber member baked in the L-shaped metal fitting 22 is integrally formed via the notch portion 23a, it is easy to bake the rubber material in the metal fitting 22.

Further, the surface in which the rubber member close to the outside, in the diametrical direction of the flange side surface in the side of the cylinder portion is baked, is brought into contact with the inner surface of the step portion 12b of the adapter 12 so as to form a stopper surface which prevents the sealing apparatus 20 from moving in an axial direction. The surface in which the rubber member close to the inside in the diametrical direction of the flange side surface in the side of the opposite cylinder portion is not baked forms a surface brought into contact with the opening end surface 8a of the outer element 3.

The rubber member baked in the flange 23 constitutes the elastic member 21 having a seal portion which is brought into contact with the seal surface in an airtight manner. As shown in FIG. 7, the portion of the elastic member 21 which is baked in the peripheral edge surface of the flange 23 has an angular cross sectional shape, and has a peripheral edge portion 21a having an outer diameter greater than an inner diameter of the large cylinder portion 12c. The angular corner portion of the peripheral edge portion 21a is brought into contact with the inner periphery of the large cylinder portion 12c of the adapter 12 and is press inserted so as to elastically deform when the sealing apparatus 20 is attached to the adapter 12, whereby a force holding the sealing apparatus 20 can be obtained. Further, the corner portion mentioned above is brought into contact therewith, and the elastic member 21 pressed by the outer element 3 inserted to the fitting operation completing position swells in a diametrical direction, whereby the peripheral edge portion 21a forms a first seal portion which is brought into contact with the inner peripheral surface of the large cylinder portion 12c corresponding to the seal surface in an airtight manner.

Further, the portion of the elastic member 21 which is baked on the flange side surface in the side of the cylinder portion is pressed to the inner surface of the annular step portion 12b of the opposing adapter 12 by the outer element 3 inserted to the fitting operation completing position, and has a second seal portion which is brought into contact with the inner surface of the step portion 12b of the inner periphery of the adapter 12 corresponding to the seal surface in an airtight manner.

Further, the portion of the elastic member 21 which is baked on the flange side surface in the side opposite to the cylinder portion is pressed to the step portion end surface 8c of the outer element 3 inserted to the fitting operating completing position, and has a third seal portion which is brought into contact with the step portion end surface 8c corresponding to the outer surface of the outer element 3 forming the seal surface in an airtight manner.

As mentioned above, the annular elastic member 21 having the first, second and third seal portions is structured such that rigidity is applied thereto by the flange 23 in which the elastic member 21 is baked so as to keep the annular shape. Accordingly, the flange 23 constitutes a reinforcing member for the elastic member 21.

The elastic outer cylinder portion 25 is formed by the rubber member baked on the cylinder portion 24, and the elastic outer cylinder portion 25 is press inserted to the inner periphery of the small cylinder portion 12a of the adapter 12, whereby the flange 23 in which the elastic member 21 is baked, that is, the sealing apparatus 20 is securely held in the step portion 12b of the adapter 12, so that the cylinder portion 24 and the elastic outer cylinder portion 25 constitute a holding portion of the sealing apparatus 20.

Further, in the elastic outer cylinder portion 25, a plurality of protruding portions 25a which protrude outward in a diametrical direction and have a circular arc-shaped outer cross section are formed on the outer periphery of the portion opposing to the inner periphery of the small cylinder portion opposing to the inner periphery of the small cylinder portion 12a of the adapter 12 so as to be arranged in a peripheral direction at a uniform interval and extend along an axial direction. These protruding portions 25a are formed so as to reduce the press insertion load. It is possible to easily adjust the press insertion load by adjusting the number of protruding portions 25a and a protruding height.

As mentioned above, sealing between the inner element 2 and the boot main body, and sealing between the outer element 3 and the adapter 12 by the boot 10, can prevent the lubricant such as grease charged within the outer element 3 and within the boot 10 from leaking, and can prevent dust, water and the like from entering into the boot 10 and the outer element 3.

A description will be given a process of assembling the inner element 2 and the outer element 3 with reference to FIGS. 2, 8 and 9.

The elastic outer cylinder portion 25 of the sealing apparatus 20 is press inserted into the inner periphery of the small cylinder portion 12 a of the adapter 12 of the boot 10, whereby the sealing apparatus 20 is attached to the step portion 12b of the adapter 12. At this time, the sealing apparatus 20 is securely held to the adapter 12 by the press inserted elastic outer cylinder portion 25. The angular peripheral edge portion 21a of the elastic member 21 also assists to hold the sealing apparatus 20 due to the elastic force caused by the elastic deformation. Further, since the elastic member 21 is structured such that rigidity is applied thereto by the flange 23, the shape thereof is held and is not easily deformed, so that the elastic member 21 is securely attached to the normal position of the step portion 12b.

Then, the boot 10 to which the sealing apparatus 20 is attached is inserted to the shaft portion 4 of the inner element 2 and the small cylinder end portion 11a of the boot main body 11 is fastened by the band 13, whereby the boot 10 is fixed to the shaft portion 4. Next, after the spider 5 is mounted to the shaft portion 4, lubricant such as grease or the like is charged within the boot 10 and within the outer element 3. Then, the roller 6 is mounted to the support shaft of the spider 5 via the holder.

The inner element 2 and the outer element 3 thus prepared are coaxially set in a horizontal direction, as shown in FIG. 2, and to align positions in a peripheral direction so that three rollers 6 of the inner element 2 respectively oppose three guide grooves of the outer element 3.

Next, the inner element 2 is inserted into the outer element 3 and the fitting operation between the adapter 12 and the outer element 3 is started together with the press inserting. A middle stage of the fitting operation is shown in FIG. 8. In this state, since the inside of the boot 10 is communicated with the open air via the communication groove 12f, the air within the boot flows out to the outside throughout the communication groove 12f as the fitting operation is further performed. Accordingly, since the pressure of the air within the boot 10 is kept at the same pressure as that of the open air, the boot main body 11 is not expanded due to the pressure of the air within the boot 10. The state whereby the inside of the boot 10 is communicated with the open air is maintained until the outer element 3 is positioned at the position near the fitting operation completing position, When the outer element 3 is positioned at the position near the fitting operation completing position, the communication between the inside of the boot 10 and the communication groove 12f is shut due to the contact between the outer element 3 and the elastic member 21, and the inside of the boot 10 is shut from the open air.

When the fitting operation is further performed, the contact surface of the flange 23 in the state that the stopper surface is brought into contact with the inner surface of the step portion 12b of the adapter 12 is brought into contact with the opening end surface 8a of the outer element 3, the axial movement of the outer element 3 against the adapter 12 is prevented, the fitting operation of the both elements is completed, and the outer element 3 occupies the fitting operation completing position. At the time when the fitting operation is completed, as shown in FIG. 9, the first, second and third seal portions of the elastic member 21 are respectively brought into contact with the inner peripheral surface of the large cylinder portion 12c of the adapter 12 corresponding to the seal surface, the inner surface of the step portion 12b of the adapter 12 and the step portion end surface 8c of the outer element 3, whereby sealing occurs, between the adapter 12 and the outer element 3 respectively. Then, a suitable compression force of the outer element 3 and the adapter 12 against the elastic member 21 is set by suitably setting the axial direction interval formed between the inner surface of the step portion 12b of the adapter 12 and the step portion end surface 8c of the outer element 3 due to the contact between flange 23 and the outer element 3, and further, the elastic member 21 is prevented from being excessively compressed.

Finally, the taper portion 12d of the adapter 12 which is in the state shown by a double dot chain line if FIG. 9 at the time when the fitting operation between the outer element 3 and the adapter 12 is completed is caulked to the groove 8e in the manner illustrated by a solid line if FIG. 9, whereby the boot 10 is prevented from being taken out from the outer element 3 and an assembly of the universal joint 1 is completed.

The embodiment is constructed as described above, thereby achieving an effect as follows:

A flange 23 to which an annular elastic member 21 is securely fixed, i.e., a sealing apparatus 20, is securely held to the inner periphery of the adapter 12 by means of an elastic outer cylinder portion 25 on the outer periphery of the cylinder portion 24 press-inserted into the small cylinder portion 12a of the adapter 12 of the boot 10, to prevent the sealing apparatus 20 from slipping off. In addition, in the elastic member 21 rigidity is imparted by the flange 23, and its shape is held. Thus, the elastic member is not easily deformed. The elastic member is easily handled when it is attached, and moreover, the elastic member is securely attached to the normal position of the stepped portion 12b in a normal attitude. Therefore, the efficiency of assembling work of the inner element 2 and the outer element 3 to which the boot 10 having the sealing apparatus 20 attached thereto is mounted is improved.

The cylinder portion 24 and the elastic outer cylinder portion 25 are positioned at the small cylinder portion 12a of the adapter 12, and the sealing surface coming into contact with the sealing portion of the elastic member 21 is positioned at the steppes portion 12b and the large cylinder portion 12c of the adapter 12. Thus, the sealing apparatus 20 can be separated into the holding capability portion including the holding member and the sealing capability portion including the elastic member 21 and the flange 23 with the stepped portion 12b being a boundary thereof, and thus, design optimal to its capability can be made.

The cylinder portion 24 constituting the holding portion is a part of a bracket 22 molded integrally with the flange 23, and the number of parts can be reduced. Further, the rigidity of the sealing apparatus 20 is increase more significantly by the cylinder portion 24 and the flange 23, and thus, its deformation occurs less readily. In addition, the elastic force of the elastic outer cylinder portion 25 is utilized for press-insertion, and thus, the adapter 12 of the holding portion is easily press-inserted into the inner periphery of the small cylinder portion 12a. Further, the sealing apparatus 20 is attached more easily due to an increase in rigidity with the cylinder portion 24 and ease of the press-insertion by the elastic outer cylinder portion 25.

The press-insertion load can be reduced by the protrusion 25a formed on the outer periphery of the elastic outer cylinder portion 25, and thus, the holding portion is press-inserted more easily. Further, the quantity or height and the like of the protrusions 25a is adjusted, whereby the press-insertion load can be easily adjusted.

Since the air within the boot 10 flows out to the open air through the communication groove 12f of the adapter 12 during the fitting operation between the outer element 3 and the adapter 12 until the outer element 3 and the adapter 12 of the boot 10 reaches the position near the fitting completing position from the fitting operation starting position corresponding to the position at which the outer element 3 and the adapter 12 of the boot 10 start fitting, at the time of assembling the inner element 2 and the outer element 3 of the universal joint 1, the pressure of the air within the boot 10 is kept at the same pressure as that of the open air. The pressure of the air within the boot 10 is adjusted at the same time when the inner element 2 and the outer element 3 are assembled, so that it is unnecessary to adjust the pressure of the air within the boot 10 after the fitting operation between the outer element 3 and the boot 10 is completed, which incidentally, is performed, so that it is possible to improve an efficiency of an assembling operation of the universal joint 1. Further, since it is unnecessary to adjust the air pressure using a tool, no damage is done to the boot 10. The communication groove 12f can be easily deformed only by applying a process for forming the groove on the existing adapter 12.

It is possible to simply and securely shut the communication between the communication groove 12f and the inside of the boot 10 by the sealing apparatus 20 which is attached to the adapter 12 of the boot 10. Further, since the sealing apparatus 20 for sealing the outer element 3 and the boot 10 is utilized in order to shut the communication between the communication groove 12f and the inside of the boot 10, it is not necessary to independently provide and form a member for closing the communication groove 12f.

Since the outer element 3 is fitted to the inner periphery of the adapter 12 in a press insertion state, a centering between the outer element 3 and the adapter 12 can be easily performed, and no play is generated between them.

The flange 23 is brought into contact with the outer element 3 and the step portion 12b of the adapter 12, whereby it is possible to set the suitable compression force applied to the elastic member 21 by the outer element 3 and the adapter 12 by suitably setting the axial interval formed between the inner surface of the step portion 12b of the adapter 12 and the step portion end surface 8c of the outer element 3. It is also possible to prevent the elastic member 21 from being excessively compressed.

In the embodiment mentioned above, the holding portion is constituted by the cylinder portion 24 and the elastic outer cylinder portion 25 having the protruding portion 25a, however, the protruding portion 25a may not be formed in the elastic outer cylinder portion 25. The elastic outer cylinder portion 25 and the elastic member 21 are integrally formed, however, both may be formed as separated elements. Further, it is possible to constitute the holding portion only by the cylinder portion 24 without providing the elastic outer cylinder portion 25. Then, in this case, if a plurality of slits extending in an axial direction are formed in the cylinder portion 24 at a uniform interval in a peripheral direction, it is possible to reduce the press insertion load.

In the embodiment mentioned above, the seal surface between the elastic member 21 and the adapter 12 is the inner surface of the step portion 12b and the inner peripheral surface of the large cylinder portion 12c, however, it may be any one of them.

In the embodiment mentioned above, the communication grooves 12f are formed at six portion, however, the number of communication grooves 12f is not limited to six, and it is possible to increase or reduce the number as required. For example, if the air within the boot 10 is smoothly taken out at the time of fitting between the adapter 12 and the outer element 3, only one communication grove 12f may be employed. The communication grooves 12f are not necessary to set the forming positions to be at a uniform interval in the peripheral direction, and it is impossible to suitably arrange them as required.

In the embodiment mentioned above, the communication passage is the communication groove 12f formed in the side of the adapter 12 in the fitting portion between the adapter 12 and the outer element 3, however, the communication groove 12f may be formed in the side of the outer element 3 of the fitting portion not in the side of the adapter 12.

In the embodiment mentioned above, the universal joint 1 is employed for the propeller shaft, however, it is possible to employ it for a drive shaft of a vehicle.

As heretofore explained, embodiments of the present invention have been described in detail with reference to the drawings. However, the specific configurations of the present invention are not limited to the embodiments but those having a modification of the design within the range of the present invention are also included in the present invention. According to the test invention according to a first embodiment of the present application, a sealing apparatus comprises: an elastic member formed of an elastic material having a sealing portion coming into contact with a sealing surface of a cylindrical member in a airtight manner; and a reinforcing member having the elastic member securely fixed thereto, the sealing apparatus being attached to the annular stepped portion formed between a small cylinder portion having a predetermined inner diameter, which is an inner peripheral surface, and a large cylinder portion having an inner diameter larger than the inner diameter, wherein the sealing surface is formed on at least one of an inner surface of the stepped portion and an inner periphery surface of the large cylinder portion, and further, holding portion to be press-inserted into the inner periphery of the small cylinder portion is provided so as to hold the reinforcing member on the inner periphery of the cylindrical member.

According to the invention according to the first embodiment, a reinforcing member to which an annular elastic member is attached, i.e., a sealing a apparatus, is securely held on the inner periphery of the cylindrical member by means of a holding portion press-inserted into a small cylinder of the cylindrical member, to reduce the tendency of the sealing apparatus to slip off. In addition, in the elastic member, rigidity is imparted by the reinforce member, and thus its shape is held. Therefore, the sealing apparatus is not easily deformed. The sealing apparatus is easily handled when it is attached, and moreover, the sealing apparatus is securely attached to the normal position of the stepped portion in a normal attitude. Therefore, efficiency of the assembling work of the member to which the sealing apparatus is attached, and moreover, the sealing apparatus is securely attached to the normal position of the stepped portion in a normal attitude. Therefore, efficiency of the assembling work of the member to which the sealing apparatus is attached is improved.

Further, the holding portion is positioned at the small cylinder portion of the cylindrical member, and the sealing surface coming into contact with the sealing portion of the elastic member is positioned at the stepped portion or large cylinder portion of the cylindrical member, Thus, the sealing apparatus can be separated into a holding capability portion including the holding portion, and a sealing capability portion including the elastic member and the reinforcing portion with the stepped portion being a boundary thereof. In this way, design optimal to its capability can be made.

As in the invention according to a second embodiment, in the sealing apparatus according to the first embodiment, the reinforcing member is provided with a cylinder portion integrally molded with the reinforcing member, and the holding portion is composed of said cylinder portion and an elastic outer cylinder portion formed of an elastic material at the outer periphery of the cylinder portion, whereby the cylinder portion constituting the holding portion is molded integrally with the reinforcing member, and thus, the number of parts can be reduced, and further, the rigidity of the sealing apparatus is increased more significantly by the cylinder portion and the reinforcing member, and thus, its deformation occurs less readily. In addition, the elastic force of the elastic outer cylinder portion is utilized for press-insertion, and thus, the cylindrical member of the holding portion is easily press-inserted into the inner periphery of the small cylinder portion. Further, the sealing apparatus is attached more easily due to an increase in rigidity with the cylindrical portion and ease of the press insertion by the elastic outer cylinder portion.

As in the invention according to a third embodiment, in the sealing apparatus according to the second embodiment, a plurality of protrusions are formed in a peripheral direction on an outer periphery surface of said elastic outer cylinder portion, whereby a press-insertion load can be reduced, and thus, the press-insertion of the holding portion is further facilitated. In addition, the quantity or height of the protrusions is adjusted, whereby the press-insertion load can be easily adjusted.

Although the invention has been illustrated and described with respect to several exemplary embodiments thereof, it should be understood by those skilled in the art that the foregoing and various other changes, omissions and additions may be made to present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A sealing apparatus of an universal joint which is provided on a fitting portion of an outer element and an adapter of a boot attached to an inner element, wherein;
   a cylindrical elastic member is fixed onto an outer periphery of a shape-holding member,
   the elastic member is press-inserted onto an inner periphery of a small cylinder portion of the adapter so that the sealing apparatus is previously held on the adapter before the adapter comes to be fitted to the outer element
   in fitting state of a fitting circumferential surface of the outer element fitting to a large cylinder portion located outward of the small cylinder portion of the adapter, the elastic member held on the adapter is interposed to be attached between an end surface of the outer element and at least one of a step portion between the small cylinder portion and the large cylinder portion of the adapter, and the large cylinder portion, so as to seal the adapter and the outer element.

2. A sealing apparatus of an universal joint according to claim 1, wherein the shape-holding member has a cylinder portion, and an elastic outer cylinder portion of the elastic member fixed onto an outer periphery of the cylinder portion of the shape-holding member is press-inserted onto the inner periphery of the small cylinder portion of the adapter so that the sealing apparatus is previously held on the adapter before the adapter comes to be fitted to the outer element.

3. A sealing apparatus of an universal joint according to claim 2, wherein a plurality of protrusions are formed in a peripheral direction on an outer periphery surface of said elastic outer cylinder portion.

4. A sealing apparatus of an universal joint according to claim 3, wherein a sealing portion of the elastic member coming into contact in an airtight manner with a sealing surface on the inner periphery surface of the large cylinder portion of said adapter, has an angular sectional shape, and has an outer diameter larger than the inner diameter of the large cylinder portion.

5. A sealing apparatus of an universal joint according to claim 4, wherein a communication passage ensuring communication between the inside of the boot and the open air is formed before said sealing apparatus comes into contact with said outer element, is formed in the inner periphery of said adapter.

6. A sealing apparatus of an universal joint according to claim 3, wherein a communication passage ensuring communication between the inside of the boot and the open air is formed before said sealing apparatus comes into contact with said outer element, is formed in the inner periphery of said adapter.

7. A sealing apparatus of an universal joint according to claim 2, wherein a sealing portion of the elastic member coming into contact in an airtight manner with a sealing surface on the inner periphery surface of the large cylinder portion of said adapter, has an angular sectional shape, and has an outer diameter larger than the inner diameter of the large cylinder portion.

8. A sealing apparatus of an universal joint according to claim 7, wherein a communication passage ensuring communication between the inside of the boot and the open air is formed before said sealing apparatus comes into contact with said outer element, is formed the inner periphery of said adapter.

9. A sealing apparatus of an universal joint according to claim 2, wherein a communication passage ensuring communication between the inside of the boot and the open air is formed before said sealing apparatus comes into contact with said outer element, is formed in the inner periphery of said adapter.

10. A sealing apparatus of an universal joint according to claim 1, wherein a sealing portion of the elastic member coming into contact in an airtight manner with a sealing surface on the inner periphery surface of the large cylinder portion of said adapter, has an angular sectional shape, and has an outer diameter larger than the inner diameter of the large cylinder portion.

11. A sealing apparatus of an universal joint according to claim 10, wherein a communication passage ensuring communication between the inside of the boot and the open air is formed before said sealing apparatus comes into contact with said outer element, is formed the inner periphery of said adapter.

12. A sealing apparatus of an universal joint according to claim 1, wherein a communication passage ensuring communication between the inside of the boot and the open air is formed before said sealing apparatus comes into contact with said outer element, is formed in the inner periphery of said adapter.

* * * * *